(12) United States Patent
Hansen

(10) Patent No.: US 9,409,188 B2
(45) Date of Patent: Aug. 9, 2016

(54) TRICKLE VALVE ASSEMBLY AND A METHOD OF SUPPLYING PARTICULATE MATERIAL THROUGH SUCH TRICKLE VALVE ASSEMBLY

(75) Inventor: Lars Elmekilde Hansen, Roskilde (DK)

(73) Assignee: Rockwool International A/S, Hedehusene (DK)

( * ) Notice: Subject to any disclaimer, the term of this patent is extended or adjusted under 35 U.S.C. 154(b) by 109 days.

(21) Appl. No.: 14/345,322

(22) PCT Filed: Sep. 7, 2012

(86) PCT No.: PCT/EP2012/067489
§ 371 (c)(1),
(2), (4) Date: Mar. 17, 2014

(87) PCT Pub. No.: WO2013/041392
PCT Pub. Date: Mar. 28, 2013

(65) Prior Publication Data
US 2014/0345715 A1 Nov. 27, 2014

(30) Foreign Application Priority Data

Sep. 19, 2011 (EP) .................................... 11181788

(51) Int. Cl.
*F16K 15/03* (2006.01)
*B04C 5/15* (2006.01)
*B04C 5/18* (2006.01)
*C03B 3/00* (2006.01)
*F16K 17/12* (2006.01)

(52) U.S. Cl.
CPC ... *B04C 5/15* (2013.01); *B04C 5/18* (2013.01); *C03B 3/00* (2013.01); *F16K 17/12* (2013.01); *Y10T 137/7902* (2015.04)

(58) Field of Classification Search
CPC ........ C03B 3/00; Y10T 137/7902; B04C 5/18
USPC ....................................... 137/527.6
See application file for complete search history.

(56) References Cited

U.S. PATENT DOCUMENTS 2,901,331 A * 8/1959 Held ...................... B01J 8/0055
137/517
2,925,177 A 2/1960 Troland
(Continued)

FOREIGN PATENT DOCUMENTS

EP  1329681 A1  7/2003
EP  2105415 A1  9/2009

OTHER PUBLICATIONS

International Search Report and Written Opinion for PCT/EP2012/067489, dated Jan. 3, 2013.

*Primary Examiner* — Kevin Lee
*Assistant Examiner* — P. Macade Nichols
(74) *Attorney, Agent, or Firm* — Dinsmore & Shohl LLP; Douglas L. Wathen

(57) ABSTRACT

The present invention concerns a trickle valve assembly for supplying particulate material exiting the bottom of a separating cyclone, comprising a separating cyclone outlet conduit having a bottom end with an inclined valve seat and a pivotable valve plate assembly with a valve plate pivoting about a valve hinge and a counter-weight on the opposite side of valve hinge, wherein the outlet conduit is provided with at least one gas inlet above the inclined valve seat which is in fluid communication with a supply of pressurised gas, such as a pressurised air supply.

10 Claims, 4 Drawing Sheets

(56) References Cited

U.S. PATENT DOCUMENTS

| | | | | |
|---|---|---|---|---|
| 4,184,662 A | * | 1/1980 | Feldman | B65D 90/623 137/244 |
| 4,494,564 A | | 1/1985 | Lukacz | |
| 5,740,834 A | * | 4/1998 | Sherowski | B01J 8/003 137/527.6 |
| 2012/0134913 A1 | * | 5/2012 | Karches | B01J 8/0055 423/502 |

* cited by examiner

TRICKLE VALVE ASSEMBLY AND A METHOD OF SUPPLYING PARTICULATE MATERIAL THROUGH SUCH TRICKLE VALVE ASSEMBLY

CROSS-REFERENCE TO RELATED APPLICATIONS

This application is the U.S. National Phase of PCT/EP2012/067489 filed Sep. 7, 2012, which claims priority of European Patent Application 11181788.8 filed Sep. 19, 2011.

FIELD OF THE INVENTION

The present invention relates to a trickle valve assembly for supplying particulate material which exits the bottom of a separating cyclone, comprising a separating cyclone outlet conduit having a bottom end with an inclined valve seat and a pivotable valve plate assembly with a valve plate pivoting about a valve hinge and a counter-weight on the opposite side of said valve hinge. The invention also relates to a method of supplying particulate material exiting the bottom of a separating cyclone through a trickle valve assembly. The invention also relates to the use of a trickle valve assembly in a process plant for melting particulate mineral material for production of mineral wool.

BACKGROUND OF THE INVENTION

Trickle valves, also called flap valves or the like, for such purpose are known from e.g. U.S. Pat. No. 4,494,564 or U.S. Pat. No. 5,740,834. The valve is provided at the bottom exit of a separating cyclone in a plant handling particulate material. The trickle valve is provided in the downwardly extending conduit from the bottom outlet of a separating cyclone. The material is then fed into a conduit or the like for further treatment. In such plants the pressure in the conduit downstream the valve is higher than the pressure in the cyclone so in order to prevent rising air from entering into the cyclone the trickle valve is installed. The trickle valve is a one-way valve allowing the separated particulate material from the cyclone to be fed from the cyclone whilst preventing air from flowing in the opposite direction due to a building up of a material plug in the upper part of the trickle valve. In operation, a steady flow of particulate material will leave the trickle valve as long as it is continuously fed with material. The flow rate is determined by the amount of material supplied from the cyclone.

In some applications for instance in the field of making mineral fibres from melting of particulate mineral material, the known trickle valve assemblies are not suitable as the trickle valve outlet conduit directly upstream of the valve tends to block due to clogging of material, i.e. the material makes a compact plug and does not flow freely from the trickle valve. A characteristic of this application is that the conduit has a relatively small diameter combined with relatively coarse material forming a relatively high material plug. Trickle valves are normally used in plants with a large outlet diameter (e.g. 1 m) combined with small material size (e.g. 50-100 μm).

On this background it is an object of the present invention to provide a valve assembly of the trickle valve type which ensures a steady material flow through the valve and prevents clogging due to the dimensions of the conduit, height of material plug and particle size of the material.

BRIEF DESCRIPTION OF THE INVENTION

The object is achieved in a first aspect of the invention by a trickle valve assembly for supplying particulate material exiting the bottom of a separating cyclone, comprising a separating cyclone outlet conduit having a bottom end with an inclined valve seat and a pivotable valve plate assembly with a valve plate pivoting about a valve hinge and a counter-weight on the opposite side of said valve hinge, wherein the outlet conduit is provided with at least one gas inlet above the inclined valve seat which is in fluid communication with a supply of pressurised gas, such as a pressurised air supply.

According to a second aspect of the invention, there is provided a method of supplying particulate material exiting the bottom of a separating cyclone through a trickle valve assembly, comprising a separating cyclone outlet conduit having a bottom end with an inclined valve seat and a pivotable valve plate assembly with a valve plate pivoting about a valve hinge and a counter-weight on the opposite side of said valve hinge, whereby the particulate material accumulating in the conduit above the valve plate is fluidised by supplying pressurised gas, such as pressurised air, through at least one gas inlet in the wall of the conduit above the inclined valve seat.

According to a third aspect of the invention the trickle valve assembly is used in a process plant for melting particulate mineral material for production of mineral wool.

By the present invention the above-mentioned problem of clogging is solved by blowing air into the conduit at the bottom of the outlet conduit in order to fluidise the build-up material in the outlet conduit. By the invention it is realised that factors such as the diameter of the conduit relative to the material particle size and also the pressure difference involved around the trickle valve influence the material flow. By fluidising the material build-up column the friction between the material and the inner wall of the conduit is reduced or even eliminated, and a free and steady flow of material trough the valve is ensured.

In an embodiment of the invention, at least two gas inlets are provided opposite each other in the outlet conduit wall in a first and a second distance from the valve seat. Preferably, these two gas inlets are provided at substantially the same horizontal position to ensure an even distribution of the injected gas, preferably pressurised air. This ensures a homogeneous fluidisation of the build-up material in the conduit above the valve seat.

Furthermore, at least one further gas inlet may be disposed above said two, first and second gas inlets. In order to ensure an even fluidisation of the build-up material it is advantageous to provide gas inlets at one or more levels above the first one or two gas inlets in order to adapt the valve assembly to the actual height of the column of build-up particulate material which may vary depending on the discharge rate of the valve.

The valve plate is pivotably arranged in the side-mounted valve hinge and with the counter-weight on the end opposite said valve plate. The counter-weight forces the valve plate against the valve seat. However, the weight of particulate material in the conduit counteracts this closing movement of the counter-weight. The counter-weight is preferably moveable on the arm whereby the height of the build-up column may be regulated in suitable correlation to the pressure difference over the trickle valve. In addition, the valve plate may be pivotably mounted on a valve arm, which is mounted in the valve hinge and with the counter-weight on its end opposite said valve plate. Hereby, the pivoting function of the valve plate is prevented from jamming due to particulate material building up in the region of the hinge.

The valve seat is inclined relative to horizontal at a first angle less than 90°, preferably less than 45°, more preferably between 25° and 40°, such as 30°. The valve seat is thus an oblique downwardly directed end of the outlet conduit.

The counter-weight arm section opposite the valve plate relative to the valve hinge is preferably provided with a downwardly inclined second angle relative to the valve plate, said second angle being larger than the first angle. The counter-weight moves in a circular path around the hinge. By this embodiment, the counter-weight is moved both upwards and outwards the more the valve plate opens. This results in an increase in the torque with which the counter-weight counteracts the opening of the valve due to the flow of material and thereby ensures the trickle valve to re-establish the equilibrium of the valve to prevent pulsation in the flow rate.

In a preferred application of the invention, the trickle valve assembly and method is used for making mineral fibres from the mineral melt by flowing the collected mineral melt through an outlet in the circulating combustion chamber to centrifugal fiberising apparatus and forming fibres. An example of such a mineral melting plant is disclosed in WO 2009/118180.

BRIEF DESCRIPTION OF THE DRAWINGS

The invention is in the following described in more detail with reference to the accompanying drawings, in which.

DETAILED DESCRIPTION OF THE INVENTION

Figure 1:
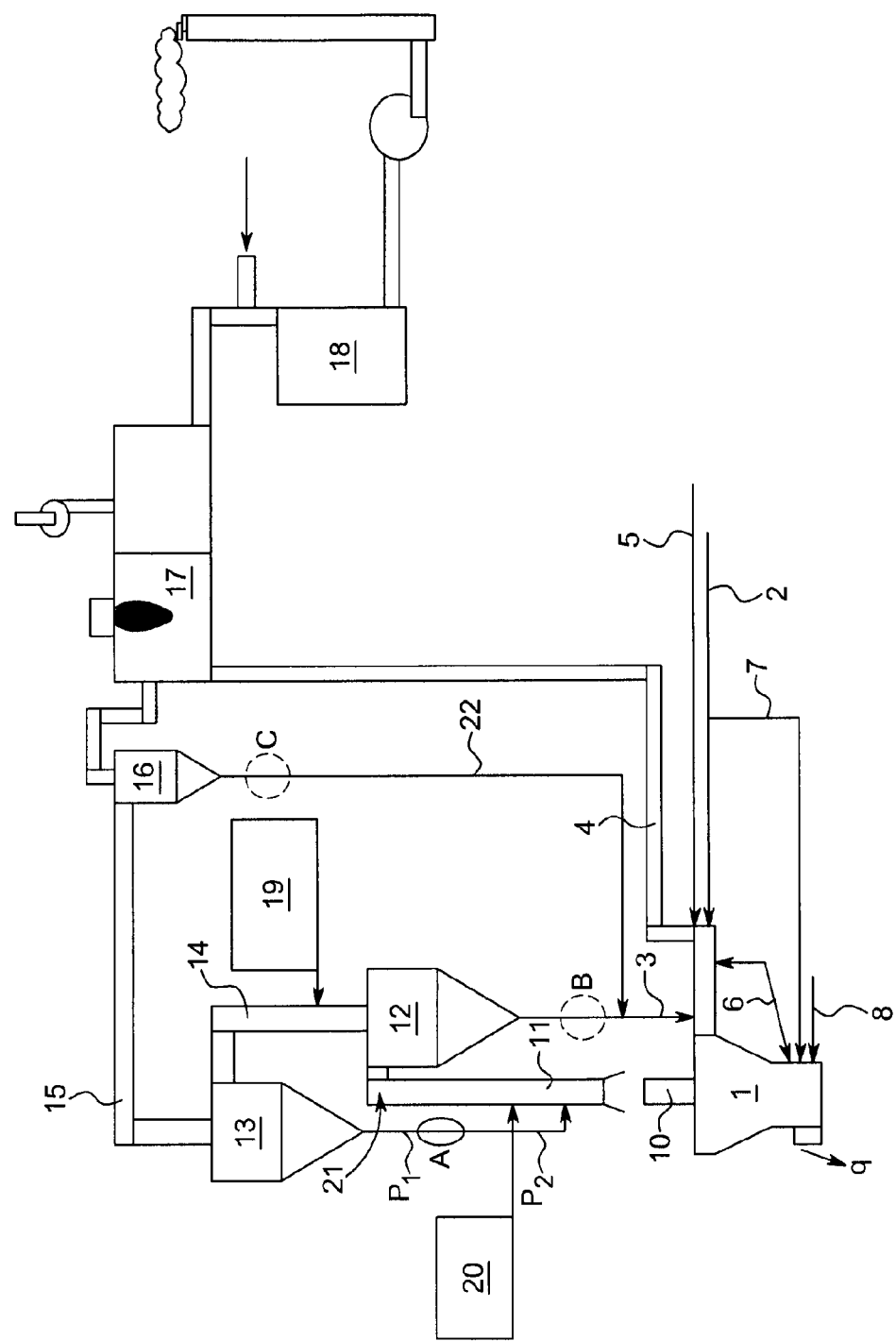
FIG. 1 is a schematic diagram of a mineral fibre production process wherein the valve assembly and method according to the present invention can be included.

FIG. 1 shows a schematic diagram of a process plant for melting particulate mineral material for making mineral fibres for mineral wool insulation slabs or the like. The process plant comprises a circulating combustion chamber 1 which comprises a cylindrical top section, a frustoconical bottom section and a cylindrical base section. Particulate fuel is introduced into the circulating combustion chamber from supply 2 and is preferably coal.

Preheated mineral material is introduced into the circulating combustion chamber via a mineral material conduit 3. The coal and mineral material are introduced together with combustion air via conduit 4 and secondary air which is provided in compressed air supply 5 and is introduced through tangential inlets such as a lance (not shown) into the circulating combustion chamber 1 to ensure thorough mixing of the coal 2 with the combustion air 6 and to sustain the circulating motion of the combustion gases and suspended material in the circulating combustion chamber 1. Secondary fuel, in this case natural gas, is also injected through supply (not shown) into the base section of the circulating combustion chamber 1.

The coal 2 is combusted in the combustion gas 6, which is preferably oxygen-enriched air 5, in the circulating combustion chamber 1. The resultant melt 9 is collected in the base zone of the circulating combustion chamber 1 and exits the chamber via an outlet. The exhaust gases are fed through the flue 10 at the top of the circulating combustion chamber 1 to the first conduit 11 where they are used to pre-heat the particular mineral materials about to be fed into the circulating combustion chamber 1. The exhaust gases then flow to a first pre-heater cyclone 12 where they are separated from the mineral materials which are at this point mixed together. The exhaust gases flow from the first pre-heater cyclone 12 to the second pre-heater cyclone 13 via a second conduit 14. Following the second pre-heater cyclone 13 the exhaust gases flow through conduit 15 to a dust cyclone 16 and into a further treatment 17 where indirect heat exchange with the combustion gas occurs to preheat the combustion gas. The exhaust gases are then treated to make them safe to pass to the atmosphere such as by filter (not shown).

The mineral materials are preheated prior to being added to the circulating combustion chamber 1. In detail, a first mineral material which is typically a raw stone material is supplied from supply 19, such as a silo, to second conduit 14 and undergoes initial preheating in second pre-heater cyclone 13. The first mineral material is then introduced into first conduit 11 and subsequently passes to the first pre-heater cyclone 12. The second mineral material is provided from supply 20, such as a silo, to the first conduit 11 downstream of the first mineral material. The second mineral material is generally a processed mineral material typically bonded mineral fibres, such as recycled mineral fibres. To ensure that NOx reducing conditions are generated in the first pre-heater cyclone 12, nitrogenous materials such as ammonia can be added at position 21 into the first conduit 11 immediately before the first pre-heater cyclone 12. Some of the first mineral materials may be carried up with the exhaust gases from the second pre-heater cyclone 13 through conduit 15. These are separated from the exhaust gases in dust cyclone 16 and recycled back to join the preheated mineral materials via conduit 22.

The exhaust gases leave the circulating combustion chamber 1 via the flue 10. The exhaust gases enter the first conduit 11 and are quenched from a temperature of between 1500 and 1900° C., usually around 1650° C. to a temperature of between 1300 and 1500° C. normally around 1400° C. by quenching air 33. The first mineral material is introduced into the first conduit 11 via inlet downstream of the second mineral material which is introduced into the first conduit 11 via the conduit 18.

The heat exchange system preferably comprises at least one and preferably two or even three pre-heater cyclones 12, 13. The first and second mineral materials are typically added to a first conduit 11 which transports exhaust gases from the circulating combustion chamber 1 to the first pre-heater cyclone 12. In the first pre-heater cyclone 12, the exhaust gases are separated from the mineral material. The mineral material, which comprises the first and second mineral materials mixed, is passed through mixed mineral material conduits 3 to the inlets of the circulating combustion chamber 1 to be melted.

In order to ensure a continuous supply of material from the bottom outlet of the second pre-heater cyclone 13, a trickle valve according to the invention is provided at the position A in FIG. 1. Furthermore, trickle valves according to the invention may also be provided in the bottom outlet conduits of the first pre-heater cyclone 12, see position B in FIG. 1, and/or the dust cyclone 16, see position C in FIG. 1.

The trickle valve (not shown in the drawing) is arranged in the downwardly extending pipe from the bottom outlet of the second pre-heater cyclone 13. The pressure $P_2$ in the riser pipe 11 is higher than the pressure $P_1$ in the second pre-heater cyclone 13, so in order to prevent rising air from entering the "wrong way" into the second pre-heater cyclone 13 some kind of one-way valve must be installed. It must be a one-way valve since pre-heated material must be able to be fed from the second pre-heater cyclone 13 into the riser pipe 11, while air must be prevented from going the opposite direction. Initially, this problem was solved by using a screw feeder from the second pre-heater cyclone 13, which created a material plug that prevented air from going from the riser pipe 11 to the second pre-heater cyclone 13. This solution caused some mechanical problems that are solved by the present invention.

Figure 2:
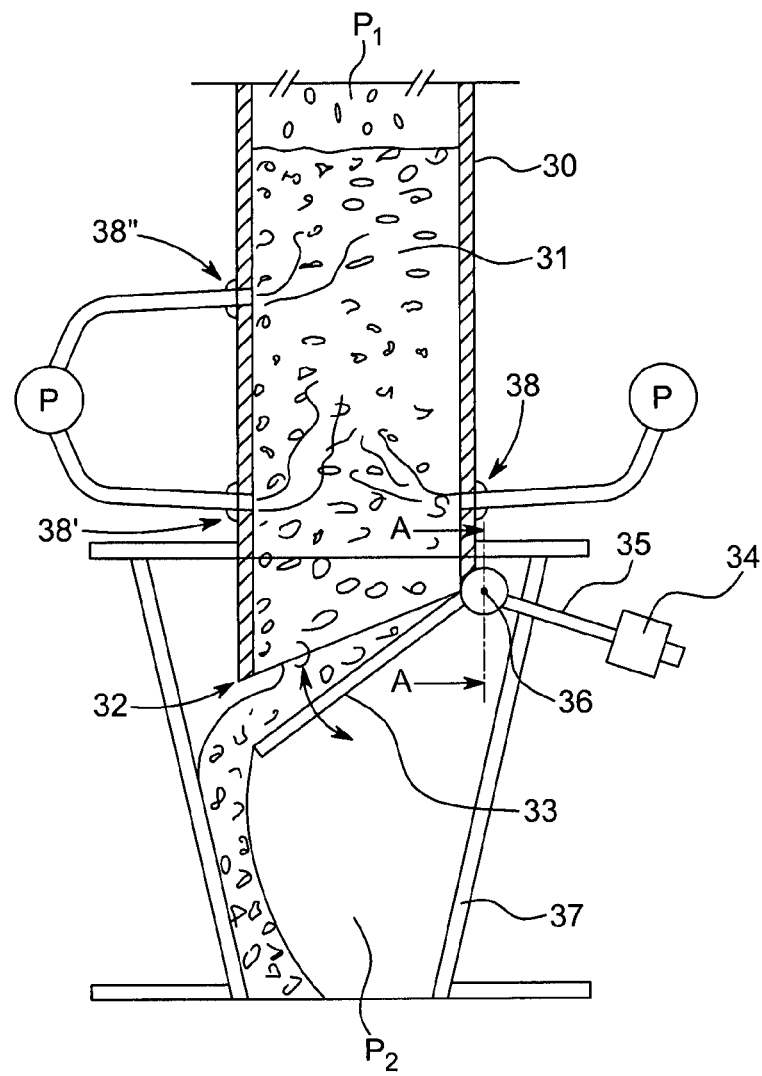
FIG. 2 is a sectional side view of a trickle valve assembly according to an embodiment of the invention.

A first embodiment of a trickle valve assembly according to the invention is shown in FIG. 2.

Particulate material 31 is fed through an outlet conduit 30 extending downwards from the bottom of the second pre-heater cyclone 13 (see FIG. 1) into the trickle valve. The conduit 30 is provided with an inclined end periphery which functions as a valve seat 32 and with a pivotable valve plate 33 side-mounted on a hinge 36 for normally closing the outlet of the conduit 30 under action of the counter-weight 34. The valve plate 33 is fixed to a valve arm 35 which opposite the hinge 36 relative to the plate 33 is provided with the counter-weight 34. A valve housing 37 is provided to receive and guide the downwards material flow out of the valve. Above the valve seat 32, a number of gas inlets 38, 38', 38" are provided in the wall of the conduit 30. These air inlets 38, 38', 38" are in fluid communication with one or more sources (P) of pressurised air. The inlets 38, 38', 38" are preferably flush with the inner surface of the conduit 30 in order to avoid wear from the abrasive properties of the particulate material.

The particulate material 31 will build up inside the outlet conduit 30. When the weight of the build-up material 31 reaches a certain level, it balances the counterweight 34 and the pressure difference $P_2-P_1$ and the valve flap 33 opens and allows some of the material to flow out. However, air from below is prevented from entering the outlet conduit 30 due to the build-up mass or plug of material 31. In operation a steady flow will leave the trickle valve as long as it is continuously fed with material.

In some applications of a conventional trickle valve, such as when heating particulate material for the making of mineral wool fibres for insulation slabs, the outlet conduit 30 tends to block, due to clogging of material 31, i.e. the material makes a solid plug and does not flow freely from the trickle valve. By the invention it is realised that this is due to the relatively small diameter of the outlet conduit 30 (e.g. 170 mm) combined with a relatively high plug of coarse material 31 (average material size: 0.5-1 mm). Trickle valves are normally used in plants with a large outlet conduit diameter (e.g. 1 m) combined with small material size (e.g. 50-100 μm), e.g. cement plants. Moreover, the pressure difference $P_2-P_1$ between the flue gas in the riser pipe 11 and that of the second pre-heater cyclone 13 counteracts the material flow. When this pressure difference $P_2-P_1$ is relatively large the height of the material 31 building up above the valve plate 33 becomes bigger. This together with the smaller diameter of the conduit 30 increases the tendency of clogging.

The present invention solves this clogging problem by blowing in air at the bottom of the outlet conduit 30 in order to fluidise the build-up material 31 in the outlet conduit 30. By fluidising the plug of material above the trickle valve it is prevented from clogging.

Figure 3:
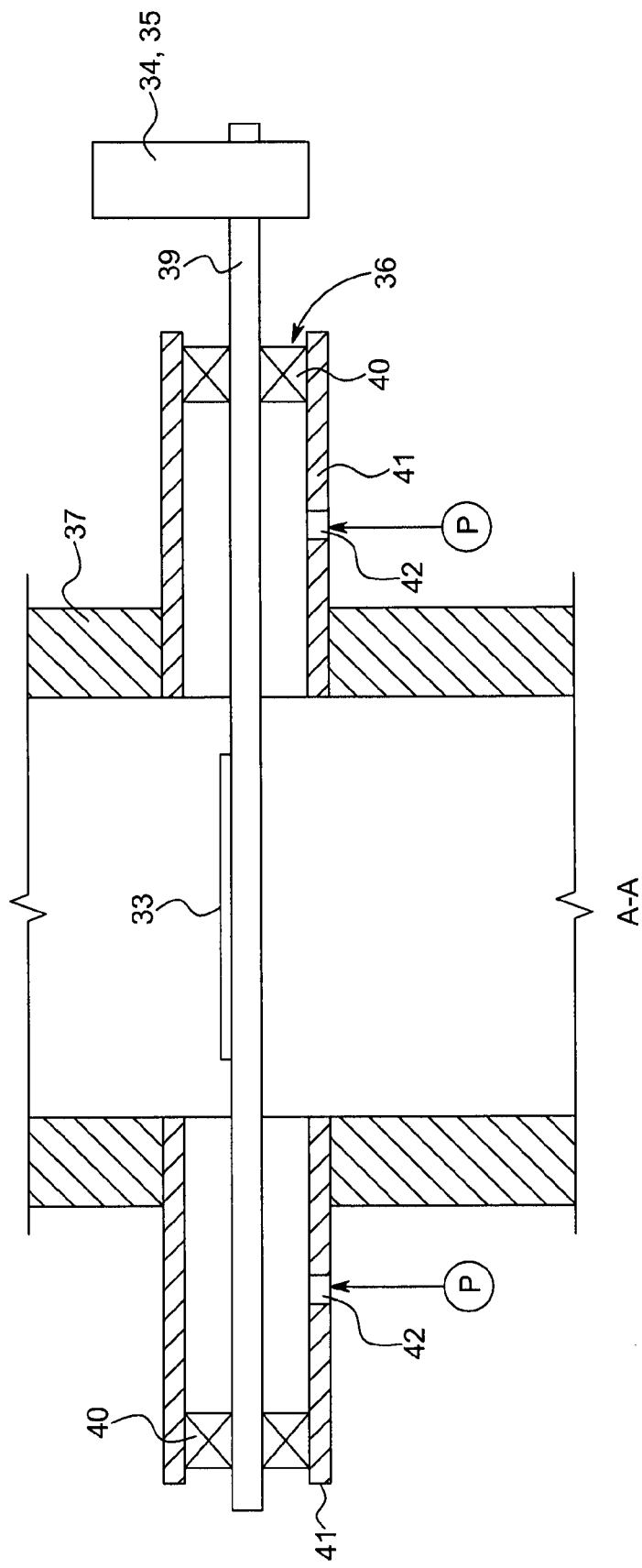
FIG. 3 is a cross-sectional detailed view of the valve shown in FIG. 2.

In FIG. 3 a detailed view of the hinge arrangement of the valve is shown along the indicated section A-A in FIG. 2. Since the material in the preferred application of the invention is pre-heated material, it is important that the valve hinge 36 also functions at elevated temperatures without clogging of material. This is ensured by arranging a pivotal rod 39 onto which the valve plate 33 is mounted inside the housing 37 and the valve arm 35 and counter-weight 34 outside the housing. The housing 37 is provided with two opposite and aligned pieces of tube 41 wherein the pivotal rod 39 is mounted on bearings 40 in each of the tubes 41. In the tubes an air inlet 42 is provided, so that cooling and anti-clogging air can be provided into the tubes and cool the bearings 40. This prevents the pivotal valve arrangement from being jammed due to excessive heat, and the air flow also prevents material from building up in the area of the tubes 41.

Figure 4:
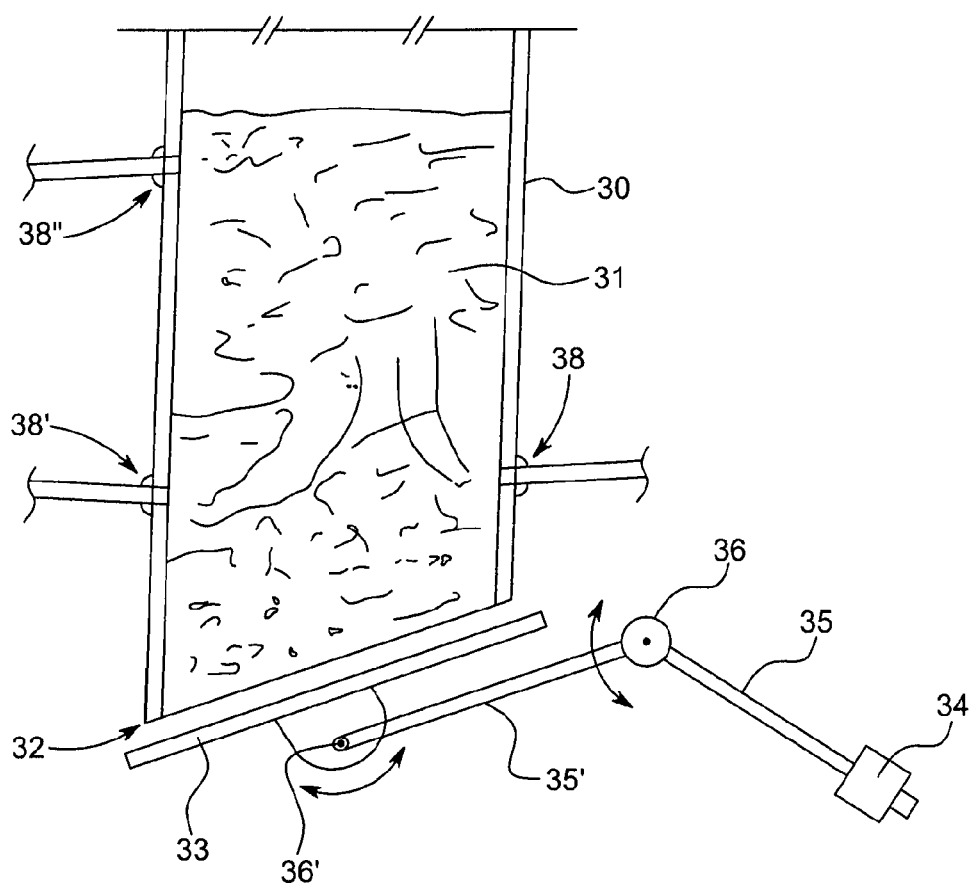
FIG. 4 is a schematic sectional side view of a second embodiment.

In FIG. 4, a second embodiment of the trickle valve assembly according to the invention is shown. The material is building up in the conduit 30 above the inclined valve seat 32 and fluidised by the injection of pressurised air through the air inlets 38, 38', 38". The valve plate 33 in this embodiment is pivotally mounted about an axis 36' substantially parallel to the hinge 36 on the valve arm extension 35' which is pivotally mounted in the hinge 36. Like in the first embodiment, the counter-weight 34 is provided on the valve arm 35. Hereby, any material building up near the hinge 36 cannot jam the valve function by preventing the valve plate 33 from closing onto the valve seat 32. Material building up in the region near the hinge, i.e. opposite the flow out of the valve, may occur, since as the flow velocity is lowest in this area. Thus the embodiment shown in FIG. 4 is advantageous if the material 31 is relative coarse as the valve plate 33 can automatically adapt its position in relation to the valve seat 32 if particulate material 31 in the region near the hinge 36 starts to build up.

The invention is described above with reference to some preferred embodiments and with reference to a particular field of application. However, it is realised that the trickle valve assembly according to the invention may be provided in other variants and used in other technical fields than the above described without departing from the scope of the invention as defined in the accompanying claims.

The invention claimed is:

1. A trickle valve assembly for supplying particulate material exiting a bottom of a separating cyclone, comprising:
   a separating cyclone outlet conduit having a bottom end defining a valve seat, the valve seat being inclined with respect to the outlet conduit;
   a pivotable valve plate assembly with a valve plate pivoting about a valve hinge and a counter-weight on an opposite side of said valve hinge, the counter-weight biasing the valve plate against the valve seat into a normally closed position; and
   at least one gas inlet disposed in the outlet conduit above the inclined valve seat, the at least one gas inlet being in fluid communication with a supply of pressurised gas, whereby pressurised gas from the at least one gas inlet fluidizes a particulate material above the valve seat;
   wherein the valve plate is opened by a weight of the particulate material counteracting the counter-weight.

2. The valve assembly according to claim 1, wherein at least two gas inlets are provided opposite each other in a outlet conduit wall in a first and a second distance from the inclined valve seat.

3. The valve assembly according to claim 2, wherein said at least two gas inlets are provided in a same horizontal plane.

4. The valve assembly according to claim 3, wherein at least one further gas inlet is disposed above said at least two gas inlets.

5. The valve assembly according to claim 1, wherein the valve plate is pivotably mounted in the valve hinge and with the counter-weight on an end opposite to said valve plate.

6. The valve assembly according to claim 1, further comprising a valve arm, the valve plate being pivotably mounted on the valve arm, the valve arm being mounted in the valve hinge and with the counter-weight on an end of the valve arm opposite said valve plate.

7. The valve assembly according to claim 1, wherein the valve seat is inclined relative to a horizontal plane at a first angle less than 90°.

8. The valve assembly according to claim 7, further comprising a counter-weight arm section opposite the valve plate relative to the valve hinge, the counter-weight aim section being provided with a downwardly inclined second angle relative to the valve plate, said second angle being larger than the first angle.

9. A method of supplying particulate material exiting a bottom of a separating cyclone, comprising:
- directing said particulate material through a trickle valve assembly, the trickle valve assembly comprising a separating cyclone outlet conduit having a bottom end defining a valve seat, the valve seat being inclined with respect to the outlet conduit, and a pivotable valve plate assembly with a valve plate pivoting about a valve hinge and a counter-weight on an opposite side of said valve hinge, the counter-weight biasing the valve plate against the valve seat into a normally closed position;, and
- fluidising the particulate material accumulating in the conduit above the valve plate by supplying pressurised gas through at least one gas inlet in a wall of the conduit above the inclined valve seat;
- wherein the valve plate is opened by a weight of the particulate material counteracting the counter-weight.

10. Use of a trickle valve assembly according to claim 1 in a process plant for melting particulate mineral material for production of mineral wool.

\* \* \* \* \*